US012789613B2

(12) United States Patent
Tolkacz et al.

(10) Patent No.: US 12,789,613 B2
(45) Date of Patent: Nov. 10, 2026

(54) ELECTRIC VEHICLE POWERTRAIN

(71) Applicant: FCA US LLC, Auburn Hills, MI (US)

(72) Inventors: Joseph M Tolkacz, Novi, MI (US); Christopher A Tuckfield, Bloomfield Hills, MI (US); Rohit N Nikam, Farmington Hills, MI (US); Barry A Mason, Bradford (CA)

(73) Assignee: FCA US LLC, Auburn Hills, MI (US)

( * ) Notice: Subject to any disclaimer, the term of this patent is extended or adjusted under 35 U.S.C. 154(b) by 351 days.

(21) Appl. No.: 18/426,409

(22) Filed: Jan. 30, 2024

(65) Prior Publication Data

US 2025/0242683 A1 Jul. 31, 2025

(51) Int. Cl.
*B60K 6/445* (2007.10)
*B60L 50/62* (2019.01)

(52) U.S. Cl.
CPC .............. *B60K 6/445* (2013.01); *B60L 50/62* (2019.02)

(58) Field of Classification Search
CPC ................................ B60K 6/445; B60L 50/62
See application file for complete search history.

(56) References Cited

U.S. PATENT DOCUMENTS

2006/0108166 A1* 5/2006 Tanaka ................... B60K 6/365 180/248
2014/0250990 A1* 9/2014 Matsunaga ............ B60K 6/442 73/114.01
2018/0216713 A1* 8/2018 LaForce .............. F16H 37/0813
2023/0011741 A1* 1/2023 Tatekawa ............... B60W 20/11

* cited by examiner

*Primary Examiner* — Edwin A Young
(74) *Attorney, Agent, or Firm* — Jeremy J. Klobucar

(57) ABSTRACT

An electrified vehicle (EV) includes a front electric drive module (EDM) configured to drive front wheels, a rear EDM configured to drive rear wheels, a high voltage battery system configured to power the front EDM and the rear EDM, and an internal combustion engine. A motor/generator is coupled to an output of the internal combustion engine and is configured to selectively generate power to charge the high voltage battery system and/or provide power directly to the front and/or rear EDMs. The front and rear EDMs provide the EV with four-wheel-drive or all-wheel-drive capability, and the motor/generator is configured to extend a driving range of the EV by charging the high voltage battery system.

20 Claims, 3 Drawing Sheets

ELECTRIC VEHICLE POWERTRAIN

FIELD

The present application relates generally to electric vehicles and, more particularly, to an electric vehicle power flow for large vehicle applications.

BACKGROUND

An electrified vehicle (EV) has an electrified powertrain including one or more battery systems that provide electrical energy to one or more electric motors. Two types of electrified vehicles are battery electric vehicles (BEVs) and plug-in hybrid electric vehicles (PHEVs). However, both types of vehicles have limitations compared to internal combustion engine vehicles, particularly for heavy-duty applications, such as heavy-duty pickup trucks that are capable of towing significant loads. For example, in a typical BEV architecture, it is difficult to provide significant towing range, while PHEVs often have limited electric drive operation and low electric driving range. Moreover, BEVs typically only have either front or rear wheel drive capability, which is not suited for large car or light/heavy-duty truck configurations. Accordingly, while such systems do work for their intended purpose, there is a desire for improvement in the relevant art.

SUMMARY

In accordance with one example aspect of the invention, an electrified vehicle (EV) is provided. In one exemplary implementation, the EV includes a front electric drive module (EDM) configured to drive front wheels, a rear EDM configured to drive rear wheels, a high voltage battery system configured to power the front EDM and the rear EDM, and an internal combustion engine. A motor/generator is coupled to an output of the internal combustion engine and is configured to selectively generate power to charge the high voltage battery system and/or provide power directly to the front and/or rear EDMs. The front and rear EDMs provide the EV with four-wheel-drive or all-wheel-drive capability, and the motor/generator is configured to extend a driving range of the EV by charging the high voltage battery system.

In addition to the foregoing, the described EV may include one or more of the following features: a front axle disconnect configured to selectively disconnect powerflow from the front EDM to the front wheels; a controller configured to selectively operate the EV in a High Efficiency Mode, when a vehicle road load is below a predetermined threshold, by activating the front axle disconnect to disconnect the powerflow from the front EDM to the front wheels to thereby conserve energy of the high voltage battery system; and wherein the front axle disconnect includes a left front wheel end disconnect to selectively disconnect a front left wheel from a front axle, and a right front wheel end disconnect to selectively disconnect a front right wheel from the axle.

In addition to the foregoing, the described EV may include one or more of the following features: an electronic locking differential operably associated with a rear axle and configured to selectively operate as a locking differential for the rear axle; a controller configured to selectively operate in an Off-Road Mode where the electronic locking differential operates as a locking differential for the rear axle; and a controller configured to selectively operate the EV in an EV Mode where the front EDM and the rear EDM are operated to provide the four-wheel-drive or all-wheel-drive capability.

In addition to the foregoing, the described EV may include one or more of the following features: a controller configured to selectively operate the EV in a Range Extended EV Mode where the internal combustion engine and the motor/generator are operated to charge the high voltage battery system to increase driving range of the EV; wherein the front EDM is located on a front axle; wherein the rear EDM is located on a rear axle; wherein each of the front and rear EDMs includes an electric traction motor, a power inverter module, and a gearbox; wherein the gearbox is a multi-speed gearbox configured to provide a high torque, low speed gear ratio to facilitate off-road driving; and wherein the EV is a range extended electrified vehicle (REEV).

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings references therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously described, typical electric vehicles (EVs) are often limited in providing sufficient range, off-road capability, and towing range, particularly for large vehicles like heavy-duty trucks. As such, for large electrified vehicle applications, such as heavy-duty pickup trucks that are capable of significant payloads and towing capacity, there is a desire to increase range and performance.

Accordingly, described herein are systems and methods for a hybrid system having a unique powerflow arrangement to provide improved range and off-road and towing capability. In one example, the hybrid electric vehicle (HEV) is a range-extended EV (REEV), also referred to as a range-extended paradigm breaker (REPB), and includes a drive system particularly advantageous for large and body on frame vehicles. In one example, the HEV includes two electric 3-in-1 drive modules (EDMs) for each axle. Each EDM includes power electronics, an electric motor, and transfer gearing to deliver motor torque to wheel torque. A high voltage battery and integrated dual charge module (IDCM) support charging of the high voltage battery from a wall charger and also supports 12V battery state of charge maintenance.

Unlike conventional battery electric drive systems, the HEV drive system described herein may be extended to provide additional driving range through the addition of an engine and a generator, which includes a generator power inverter to convert mechanical power to electrical power. Other components include a wheel end disconnect, an e-Locker, and a multi-speed gearbox. The wheel end disconnect is configured to selectively disable the front axle for high efficiency, lower load conditions, and the e-Locker is a feature that enables the vehicle to function as a locked differential for off-road driving. A multi-speed gearbox may be provided on the rear and/or front drivetrain to provide additional capability such as for launch on steep grades, drawbar and off-road maneuvers.

In this way, the EV powertrain described herein is configured to provide (i) both commuter style electric range and capability for extended range in a single power flow, (ii) the ability to operate in a high efficiency mode by disconnecting the front axle when road load is light enough to be managed by the rear electric drive module only, (iii) off-road capability through an emulated or electronically locked differential, (iv) significant towing capability (e.g., 14,000+ lbs.), and (v) integrated chassis components.

Figure 1:
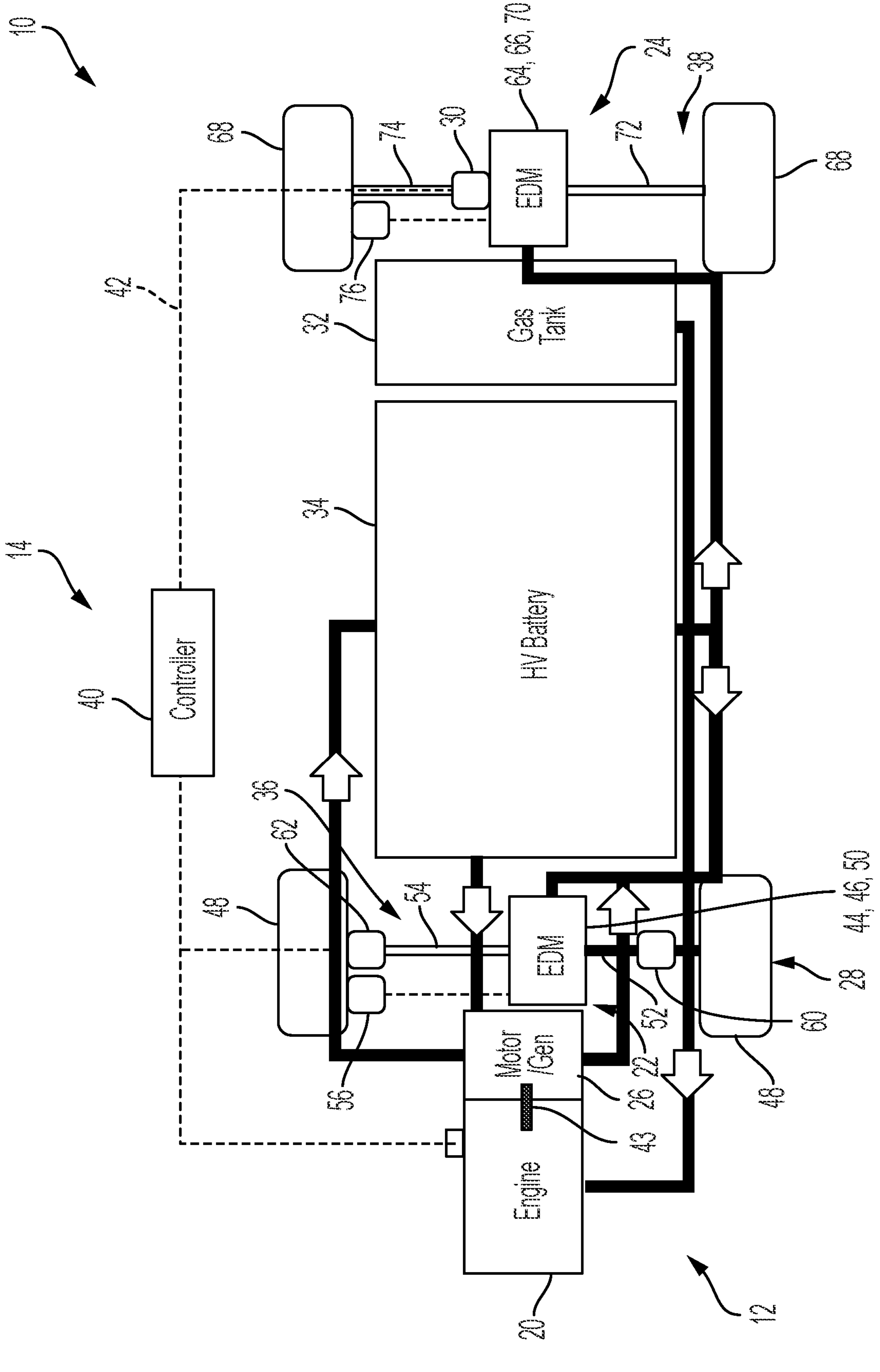
FIG. 1 is a schematic illustration of an example series hybrid electric vehicle (HEV) powertrain, in accordance with the principles of the present application.

With initial reference to FIG. 1, a schematic diagram of an example REEV/REPB vehicle 10 is illustrating having a hybrid powertrain 12 and a powertrain control system 14 according to example implementations of the disclosure. In the illustrated example, the powertrain 12 generally includes an internal combustion engine 20, a front and rear electric drive module (EDM) 22, 24, a motor/generator 26, a front axle disconnect system 28, and an electronic locker (e-Locker) system 30. As described herein in more detail, the electric vehicle 10 advantageously provides four-wheel-drive (4WD) capability, a high efficiency mode with the front axle disconnect, and improved off-road capability with a selectively activated locking differential function.

The engine 20 receives fuel (e.g., gasoline) from a fuel tank 32 and combusts a mixture of air and fuel within cylinders to drive pistons and generate torque. The generated torque drives the motor/generator 26 to produce electricity to charge a high voltage (HV) battery 34 or power the EDMs 22, 24 directly. In other operations, the motor/generator 26 is powered by the HV battery 34 to control engine stop/start operations. The EDMs 22, 24, which include an electric traction motor, are powered by the HV battery 34 and/or the motor/generator 26 to selectively and respectively provide drive torque to a front axle 36 and/or a rear axle 38. The vehicle 10 includes a low voltage battery system (not shown) configured to support various low voltage (e.g., 12V) loads of the vehicle 10, for example, to power various electrical components, and the high voltage battery 34 is configured to power high voltage loads such as the EDMs 22, 24, and to start/stop the motor/generator 26.

In the example embodiment, the hybrid powertrain 12 is controlled by the powertrain control system 14, which generally includes one or more controllers 40, such as a hybrid control processor (HCP) and/or engine control unit (ECU). The controller 40 is a central supervisory control configured to communicate with various components/modules of the hybrid powertrain 12 via a CAN bus 42. Accordingly, this propulsion system can interface with all levels of autonomous driving such as, for example regen braking torque can be incorporated as well as the propulsion torque of the electric motors.

In general, the engine 20 combusts a mixture of fuel and air to drive pistons (not shown) that rotatably turn a crankshaft 43 to generate drive torque. The drive torque is transferred to the motor/generator 26 to generate electricity, which is subsequently stored in the HV battery 34 or used directly by the EDMs 22, 24.

The EDM 22 is a front propulsion system and generally includes an electric machine (e.g., electric traction motor 44), which can operate reversibly as a motor or a generator. As illustrated, the electric motor 44 is electrically coupled to battery 34 via a power inverter module (PIM) 46 and a HV distribution center (not shown), and is configured to drive front wheels 48 through a single or multi-speed gearbox 50 and front axle shafts 52, 54. The front wheels 48 are associated with a front regenerative braking system 56 to enable the electric motor 44 to generate electricity, which may then be stored in the battery 34 for later use by EDMs 22, 24. In the illustrated arrangement, the electric machine 44 is configured to charge the battery 34 (e.g., regenerative braking), or provide torque to alternatively drive front wheels 48. In this way, the electric machine 44 is configured to provide drive torque drive torque through front axle shafts 52, 54 to the front wheels 48.

In the example embodiment, the front axle disconnect system 28 generally includes a first wheel-end disconnect mechanism 60 and a second wheel end disconnect mechanism 62. The first wheel-end disconnect mechanism 60 is operably associated with the left front axle shaft 52, and the second wheel-end disconnect mechanism 62 is operably associated with the right front axle shaft 54. The first and second wheel-end disconnect mechanisms 60, 62 are in signal communication with controller 40 and configured to selectively disconnect the front wheels 48 from the front axle shafts 52, 54.

In one example, the disconnect system 28 is in an open (disconnected) position when the driver power request is below the capability of the rear EDM 24. Additional calibrations may be included for the disconnect system 28 to be in the open or closed position within certain temperature ranges, drive modes (e.g., Sport mode), and vehicle speeds. When the disconnect system 28 is open, overall system efficiency is improved due to reduced drag losses on the front axle 52 and increased efficiency of the rear EDM 24.

The front wheel end disconnect system 28 may be fully engaged during vehicle launch (e.g., acceleration from 0 mph vehicle speed). The controller 40 may then send a command to disengage the wheel end disconnect mechanisms 60, 62 at a calibratable predetermined speed. Such an event may occur sequentially or simultaneously, depending upon the angle of front wheels 48. During deceleration/coasting, controller 40 may send a command to engage the front wheel disconnect mechanisms 60, 62 at a calibratable predetermined lower speed. Moreover, the wheel end disconnect system 28 may be calibrated to engage/disengage quickly based on the driver torque demand to maintain vehicle stability.

In the example implementation, the rear EDM 24 is a rear propulsion system and generally includes an electric machine (e.g., electric traction motor 64), which can also operate reversibly as a motor or a generator. The electric motor 64 is electrically coupled to the battery 34 via a PIM 66, and is configured to drive rear vehicle wheels 68 through a single or multi-speed gearbox 70 and rear axle shafts 72,

74. The rear wheels 68 are associated with a rear regenerative braking system 76 to enable the electric motor 64 to generate electricity, which may then be stored in the battery 34 for later use by EDMs 22, 24. As such, the electric motor 64 advantageously distributes torque across the rear axle 38 to allow vehicle 10 to operate in a 4WD or AWD mode.

With continued reference to FIG. 1, the vehicle 10 also includes the e-locker system 30 configured to selectively function as a locked differential for an off-road driving mode. In the example embodiment, the e-locker system 30 is configured to improve vehicle traction in low speed, low friction scenarios. The e-locker system 30 is a user-selectable feature (e.g., via button or user interface) for traction limited situations at low speed. Actuation of the e-locker system 30 is configured to lock the output shafts 72, 74 together to provide 100% of available torque to the wheels with traction. The e-locker system 30, when required, is configured to disengage above a predetermined speed threshold and will re-engage when the vehicle speed drops below the predetermined speed threshold. Moreover, the e-locker system 30 will automatically disconnect when no power is applied.

Figure 3:
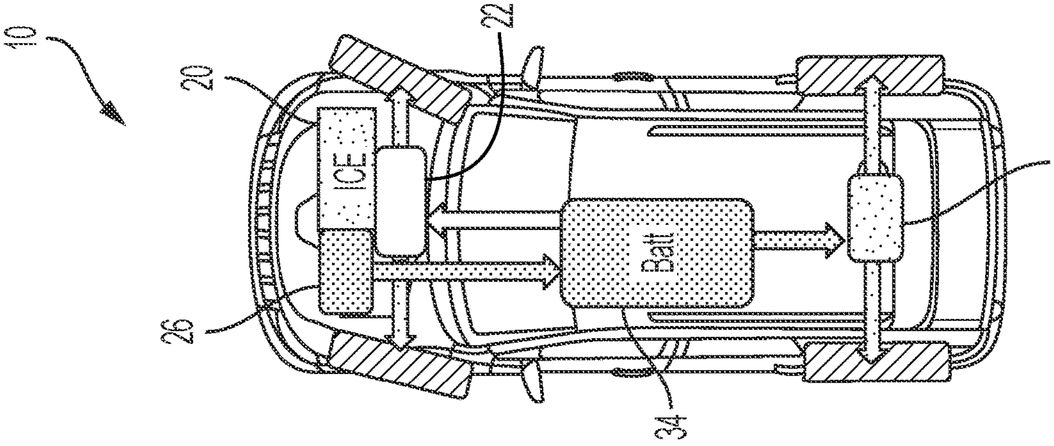
FIG. 3 is a schematic illustration of the HEV shown in FIG. 1 operating in an example range extended electric vehicle (REEV) mode, in accordance with the principles of the present application.
Figure 2:
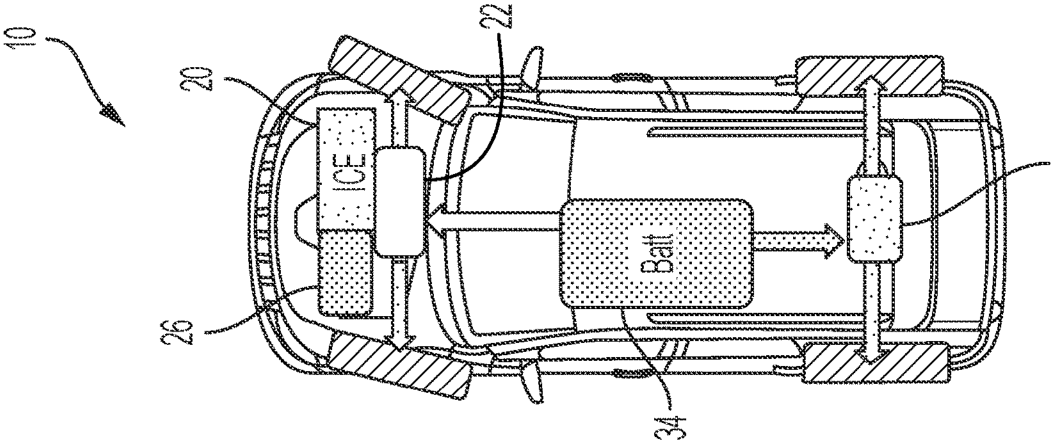
FIG. 2 is a schematic illustration of the HEV shown in FIG. 1 operating in an example electric vehicle (EV) mode, in accordance with the principles of the present application.
Figure 5:
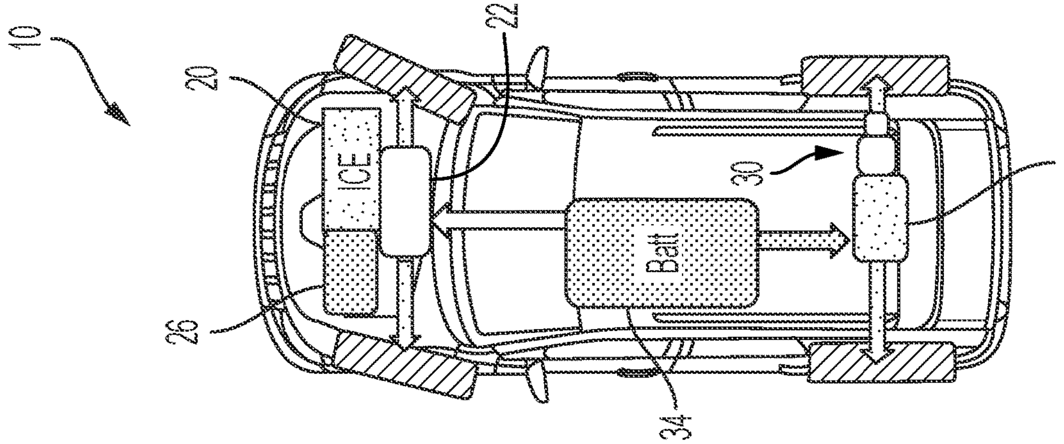
FIG. 5 is a schematic illustration of the HEV shown in FIG. 1 operating in an example off-road mode, in accordance with the principles of the present application.
Figure 4:
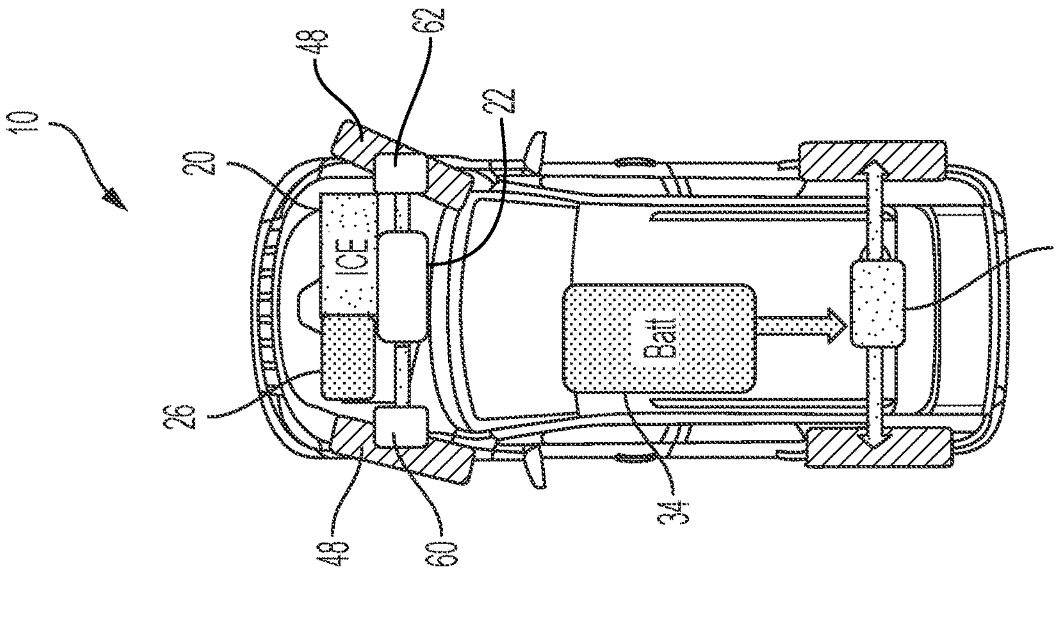
FIG. 4 is a schematic illustration of the HEV shown in FIG. 1 operating in an example high efficiency mode, in accordance with the principles of the present application.

With reference now to FIGS. 2-5, operational modes of the vehicle 10 will be described in more detail. FIG. 2 illustrates operation in an EV mode, FIG. 3 illustrates operation in a Range Extended EV mode, FIG. 4 illustrates operation in a High Efficiency mode, and FIG. 5 illustrates operation in an Off-Road mode. One or more controllers (e.g., controller 40) are in communication with various components of the vehicle 10, such as the engine 20, EDMs 22, 24, motor/generator 26, front axle disconnect system 28, and e-Locker system 30, to thereby perform the specific operational modes.

FIG. 2 illustrates operation in the EV mode where EDMs 22, 24 are operated to provide propulsion for the vehicle 10. In this mode, EDM 22 is utilized to provide driving torque to the front wheels 48, and EDM 24 is utilized to provide driving torque to the rear wheels 68. This operation is particularly useful when vehicle 10 is carrying a light to moderate load in urban or steady state highway driving conditions. Moreover, this operation provides vehicle 10 with 4WD/AWD capability for improved surface traction.

FIG. 3 illustrates operation in the Range Extended EV mode where EDM 22 and/or EDM 24 are operated to provide propulsion for the vehicle 10. However, in this mode, the motor/generator 26 is also operated to produce electricity to charge the HV battery 34, or directly power the EDMs 22 and/or 24 and extend the driving range of vehicle 10. This mode may be initiated, for example, once the HV battery state of charge falls below a predetermined threshold, a navigational route indicates the HV battery 34 will not have enough power to reach a destination, map data indicates steep inclines that require additional power, etc. This operation is particularly useful when vehicle 10 is traveling long distances, carrying a heavy payload, and/or towing.

FIG. 4 illustrates operation in the High Efficiency mode where front EDM 22 is disabled and rear EDM 24 is operated to provide propulsion for the vehicle 10. Additionally, in this mode, the front axle disconnect system 28 is activated to disconnect the front wheels 48 and/or front axles 52, 54 from the front EDM 22. This operation is particularly useful when the vehicle road load is light enough to be managed by the rear EDM 24 only, thereby conserving energy of HV battery 34 and motor/generator 26 (in low battery SOC conditions) by reducing the overall system energy loss of the vehicle.

FIG. 5 illustrates operation in the Off-Road mode where EDMs 22, 24 are operated to provide 4WD/AWD propulsion for the vehicle 10. In addition, in this mode, the e-Locker system 30 is activated to provide a locking differential function for the front axle 36 and/or the rear axle 38. Moreover, the EDM front gearbox 50 and/or rear gearbox 70 may be multi-speed gearboxes to provide a lower gear ratio to generate high torque for off-road maneuvers.

Described herein are systems and methods for a range extended electric vehicle powertrain. The range extended electric vehicle includes front and rear electric drive modules powered by a high voltage battery system, an engine and motor/generator, a front axle disconnect system, and an electronic locker system. The front and rear electric drive modules selectively provide 4WD/AWD capability, and the engine and motor/generator are configured to recharge the high voltage battery system and/or power the EDMs directly to extend vehicle range. The front axle disconnect system selectively disconnects the front axle from the front electric drive module to improve energy efficiency, and the electronic locker system provides a locking differential function for off-road driving.

It will be appreciated that the term “controller” or “module” as used herein refers to any suitable control device or set of multiple control devices that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture.

It will be understood that the mixing and matching of features, elements, methodologies, systems and/or functions between various examples may be expressly contemplated herein so that one skilled in the art will appreciate from the present teachings that features, elements, systems and/or functions of one example may be incorporated into another example as appropriate, unless described otherwise above. It will also be understood that the description, including disclosed examples and drawings, is merely exemplary in nature intended for purposes of illustration only and is not intended to limit the scope of the present application, its application or uses. Thus, variations that do not depart from the gist of the present application are intended to be within the scope of the present application.

What is claimed is:

1. An electrified vehicle (EV), comprising:

a front electric drive module (EDM) configured to drive front wheels;

a rear EDM configured to drive rear wheels;

a high voltage battery system configured to power the front EDM and the rear EDM;

an internal combustion engine;

a motor/generator coupled to an output of the internal combustion engine and configured to selectively generate power to charge the high voltage battery system and/or provide power directly to the front and/or rear EDMs;

a front axle disconnect configured to selectively disconnect powerflow from the front EDM to the front wheels;

a controller configured to selectively operate the EV in a High Efficiency Mode, when a vehicle road load is below a predetermined threshold, by activating the front axle disconnect to disconnect the powerflow from the front EDM to the front wheels to thereby conserve energy of the high voltage battery system, wherein the front and rear EDMs provide the EV with four-wheel-drive or all-wheel-drive capability, and wherein the motor/generator is configured to extend a driving range of the EV by charging the high voltage battery system.

2. The EV of claim 1, further comprising an electronic locking differential operably associated with a rear axle and configured to selectively operate as a locking differential for the rear axle.

3. The EV of claim 2, further comprising a controller configured to selectively operate in an Off-Road Mode where the electronic locking differential operates as the locking differential for the rear axle.

4. The EV of claim 1, further comprising a controller configured to selectively operate the EV in an EV Mode where the front EDM and the rear EDM are operated to provide the four-wheel-drive or all-wheel-drive capability.

5. The EV of claim 1, further comprising a controller configured to selectively operate the EV in a Range Extended EV Mode where the internal combustion engine and the motor/generator are operated to charge the high voltage battery system to increase the driving range of the EV.

6. The EV of claim 1, wherein the front EDM is located on a front axle.

7. The EV of claim 6, wherein the rear EDM is located on a rear axle.

8. The EV of claim 1, wherein each of the front and rear EDMs includes an electric traction motor, a power inverter module, and a gearbox.

9. The EV of claim 8, wherein the gearbox is a multi-speed gearbox configured to provide an increased torque, reduced speed gear ratio to facilitate off-road driving.

10. The EV of claim 1, wherein the EV is a range extended electrified vehicle (REEV).

11. An electrified vehicle (EV), comprising:

a front electric drive module (EDM) configured to drive front wheels;

a rear EDM configured to drive rear wheels;

a high voltage battery system configured to power the front EDM and the rear EDM;

an internal combustion engine;

a front axle disconnect configured to selectively disconnect powerflow from the front EDM to the front wheels; and a motor/generator coupled to an output of the internal combustion engine and configured to selectively generate power to charge the high voltage battery system and/or provide power directly to the front and/or rear EDMs, wherein the front and rear EDMs provide the EV with four-wheel-drive or all-wheel-drive capability, wherein the motor/generator is configured to extend a driving range of the EV by charging the high voltage battery system, and wherein the front axle disconnect comprises:

a left front wheel end disconnect to selectively disconnect a front left wheel from a front axle; and a right front wheel end disconnect to selectively disconnect a front right wheel from the front axle.

12. The EV of claim 11, further comprising an electronic locking differential operably associated with a rear axle and configured to selectively operate as a locking differential for the rear axle.

13. The EV of claim 12, further comprising a controller configured to selectively operate in an Off-Road Mode where the electronic locking differential operates as the locking differential for the rear axle.

14. The EV of claim 11, further comprising a controller configured to selectively operate the EV in an EV Mode where the front EDM and the rear EDM are operated to provide the four-wheel-drive or all-wheel-drive capability.

15. The EV of claim 11, further comprising a controller configured to selectively operate the EV in a Range Extended EV Mode where the internal combustion engine and the motor/generator are operated to charge the high voltage battery system to increase the driving range of the EV.

16. The EV of claim 11, wherein the front EDM is located on a front axle.

17. The EV of claim 16, wherein the rear EDM is located on a rear axle.

18. The EV of claim 11, wherein each of the front and rear EDMs includes an electric traction motor, a power inverter module, and a gearbox.

19. The EV of claim 18, wherein the gearbox is a multi-speed gearbox configured to provide a high torque, low speed gear ratio to facilitate off-road driving.

20. The EV of claim 11, wherein the EV is a range extended electrified vehicle (REEV).

* * * * *